United States Patent
Park

(10) Patent No.: US 9,407,096 B2
(45) Date of Patent: Aug. 2, 2016

(54) POWER CONTROL APPARATUS AND POWER CONTROL METHOD FOR SECURING RESERVE POWER AGAINST POWER FAILURE

(75) Inventor: Jongsoo Park, Gunpo-si (KR)

(73) Assignee: LG ELECTRONICS INC., Seoul (KR)

( * ) Notice: Subject to any disclaimer, the term of this patent is extended or adjusted under 35 U.S.C. 154(b) by 602 days.

(21) Appl. No.: 12/974,072

(22) Filed: Dec. 21, 2010

(65) Prior Publication Data

US 2012/0105011 A1    May 3, 2012

(30) Foreign Application Priority Data

Nov. 1, 2010    (WO) ................ PCT/KR2010/007587

(51) Int. Cl.
    *H02J 3/32*     (2006.01)
    *H02J 3/14*     (2006.01)
    (Continued)

(52) U.S. Cl.
    CPC ... *H02J 3/32* (2013.01); *H02J 3/14* (2013.01); *H02J 7/0047* (2013.01); *H02J 9/005* (2013.01); *H02J 9/06* (2013.01); *H02J 13/0006* (2013.01); *H02J 2003/143* (2013.01); *H02J 2003/146* (2013.01); *H02J 2007/005* (2013.01); *Y02B 70/3225* (2013.01); *Y02B 70/3233* (2013.01); *Y02B 70/3266* (2013.01); *Y02B 70/3291* (2013.01); *Y02B 90/222* (2013.01); *Y04S 20/12* (2013.01); *Y04S 20/222* (2013.01); *Y04S 20/224* (2013.01); *Y04S 20/225* (2013.01); *Y04S 20/242* (2013.01); *Y04S 20/248* (2013.01)

(58) Field of Classification Search
    CPC  Y02B 70/3291; Y02B 90/222; Y04S 20/248; Y04S 20/12

USPC ........................... 320/137, DIG. 10, DIG. 11
See application file for complete search history.

(56) References Cited

U.S. PATENT DOCUMENTS

| | | | |
|---|---|---|---|
| 7,747,739 B2 * | 6/2010 | Bridges et al. | 709/224 |
| 8,330,425 B2 * | 12/2012 | Hughes et al. | 320/137 |
| 2007/0200433 A1 | 8/2007 | Kelty | |
| 2008/0296975 A1 * | 12/2008 | Shakespeare et al. | 307/66 |
| 2011/0101779 A1 * | 5/2011 | Patel et al. | 307/64 |

FOREIGN PATENT DOCUMENTS

| | | |
|---|---|---|
| CN | 1816463 A | 8/2006 |
| JP | 2004-355219 A | 12/2004 |

(Continued)

OTHER PUBLICATIONS

English Machine translation of JP2009148070.*

(Continued)

*Primary Examiner* — Yalkew Fantu
*Assistant Examiner* — Manuel Hernandez
(74) *Attorney, Agent, or Firm* — Birch, Stewart, Kolasch & Birch, LLP

(57) ABSTRACT

A power control apparatus and a power control method for efficiently securing reserve power as a precaution against power failure are disclosed. The power control device includes a first communication unit configured to receive power information including power failure information through a power information network, a second communication unit configured to receive reserve power information including remaining power information from a power storage unit for storing reserve power, and a control unit configured to generate charging control information for storing reserve power in the power storage unit based on the power information and the reserve power information and to control storage of the power in the power storage unit.

12 Claims, 10 Drawing Sheets

(51) Int. Cl.
*H02J 7/00* (2006.01)
*H02J 9/00* (2006.01)
*H02J 9/06* (2006.01)
*H02J 13/00* (2006.01)

(56) References Cited

FOREIGN PATENT DOCUMENTS

| JP | 2007-72074 A | 3/2007 |
| JP | 2007-336693 A | 12/2007 |
| JP | 2008-182851 A | 8/2008 |
| JP | 2009148070 A * | 7/2009 |
| JP | 2011196826 A * | 10/2011 |
| KR | 10-2010-0013130 A | 2/2010 |
| KR | 10-2010-0105435 A | 9/2010 |
| WO | WO 99/34342 A1 | 7/1999 |

OTHER PUBLICATIONS

English Machine Translation of JP2011196826.*

* cited by examiner

Power Control Apparatus and Power Control Method for Securing Reserve Power Against Power Failure This application claims the benefit of International Patent Application No. PCT/KR2010/007587, filed on Nov. 1, 2010, which is hereby incorporated by reference as if fully set forth herein.

BACKGROUND OF THE INVENTION

1. Field of the Invention

The present invention relates to a power control apparatus and a power control method, and more particularly, to a power control apparatus and a power control method for efficiently securing reserve power as a precaution against power failure.

2. Discussion of the Related Art

Current power systems are designed to produce electricity greater than electricity used in practice by 10%, which is set in consideration of peak power consumption as a precaution against the case where more electricity is used. Accordingly, in the current power system, fuels and various power generation facilities are additionally necessary. In addition, wasted electricity deteriorates energy efficiency. Furthermore, the amount of carbon dioxide emitted in a process of burning coal, oil, gas, etc is high.

If a required amount of electricity is generated or electricity is used according to the amount of generated electricity, it is possible to prevent global warming while more efficiently using electricity. A smart grid includes technology for measuring electrical demand, the amount of supplied electricity and the state of a power line by applying information technology to a power network so as to maximize energy efficiency.

If the smart grid is used, a consumer and a power supply can exchange information with each other in real time by applying information technology such as ZigBee and power line communication to a power network. Accordingly, the consumer can save money by enabling electrical appliances to automatically operate at a time when the power rate is low.

A power generator can check a power use state in real time so as to flexibly adjust a power supply amount. At a time when power consumption is low, a maximum power amount is not maintained or remaining power is used for pumping-up power generation. Thus, electricity waste can be reduced, and power can be stored and then supplied at a time when power consumption is high. In addition, it is possible to prevent power network failure due to overload.

As a result, the smart grid is a system for efficiently managing all electrical apparatuses including electrical appliances used in the home, such as TVs or refrigerators, and various industrial apparatuses used in factories. It is possible to check power rates used in the home, offices and factories in real time and to use electricity at a time other than when a power rate is high, such as in the daytime.

SUMMARY OF THE INVENTION

Accordingly, the present invention is directed to a power control apparatus and a power control method that substantially obviate one or more problems due to limitations and disadvantages of the related art.

An object of the present invention is to provide a power control apparatus and a power control method for receiving power failure information and efficiently securing reserve power as a precaution against power failure, using smart grid technology.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a power control device includes a first communication unit configured to receive power information including power failure information through a power information network, a second communication unit configured to receive reserve power information including remaining power information from a power storage unit for storing reserve power, and a control unit configured to generate charging control information for storing reserve power in the power storage unit based on the power information and the reserve power information and to control storage of the power in the power storage unit.

The power information may further include power demand information of a power consumer, the power failure information may include power failure duration information, the power demand information may include information about the amount of power required by the power consumer per unit time, and the reserve power information further includes information about the amount of power stored in the power storage unit per unit time.

The control unit may generate necessary power amount information based on the power failure duration information and the information about the amount of power required by the power consumer per unit time, generate necessary charge information based on the necessary power amount information and the remaining power information, and generate the charging duration information of the power storage unit based on the necessary charge information and the information about the amount of power stored in the power storage unit per unit time.

The power failure information may further include power failure start time information, and the control unit may generate charging start time information based on the power failure start time information and the charging duration information.

The power information may further include hourly power rate information, and the control unit may generate optimal charging start time information based on the hourly power rate information.

The power failure information may further include blackout area information, and the control unit may determine whether the power consumer is within a blackout area based on the blackout area information.

The power control device may further include a display unit configured to display and present the power failure information, the power demand information, the reserve power information and the charging control information to a user.

The power control device may further include an input unit configured to enable the user to input a charging control command, and the control unit may control the storage of the power in the power storage unit according to the charging control command.

The control unit may control the power storage unit to supply power to the power consumer upon power failure and control the power consumer to be switched to a power saving mode for reducing power consumption.

The power control device may be any one of a smart server, a smart meter, a smart TV, and a smart phone.

In another aspect of the present invention, a power control method includes receiving power information including power failure information, receiving reserve power information including remaining power information from a power storage unit for storing reserve power, generating charging control information for storing the reserve power in the power storage unit based on the power information and the reserve power information, and controlling the storage of power in the power storage unit according to the charging control information.

The power failure information may include power failure duration information, the power demand information may include information about the amount of power required by the power consumer per unit time, and the reserve power information further includes information about the amount of power stored in the power storage unit per unit time. The generating of the charging control information may include generating necessary power amount information based on the power failure duration information and the information about the amount of power required by the power consumer per unit time, generating necessary charge information based on the necessary power amount information and the remaining power information, and generating charging duration information of the power storage unit based on the necessary charge information and the information about the amount of power stored in the power storage unit per unit time.

The power failure information may further include power failure start time information, and the generating of the charging control information may further include generating charging start time information based on the power failure start time information and the charging duration information.

The power information may further include hourly power rate information, and the generating of the charging start time information may further include generating optimal charging start time information based on the hourly power rate information.

The power failure information may further include blackout area information, and the method may further include determining whether the power consumer is within a blackout area based on the blackout area information.

The power control method may further include displaying and presenting the power failure information, the power demand information, the reserve power information and the charging control information to a user.

The power control method may further include receiving charging control command from a user, and controlling the storage of the power in the power storage unit according to the charging control command.

The power control method may further include supplying power from the power storage unit to the power consumer upon power failure and switching the power consumer to a power saving mode for reducing power consumption.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. The following embodiments are provided to describe the technical spirit of the present invention, and the technical range of the present invention is not limited to the following embodiments.

Figure 1:
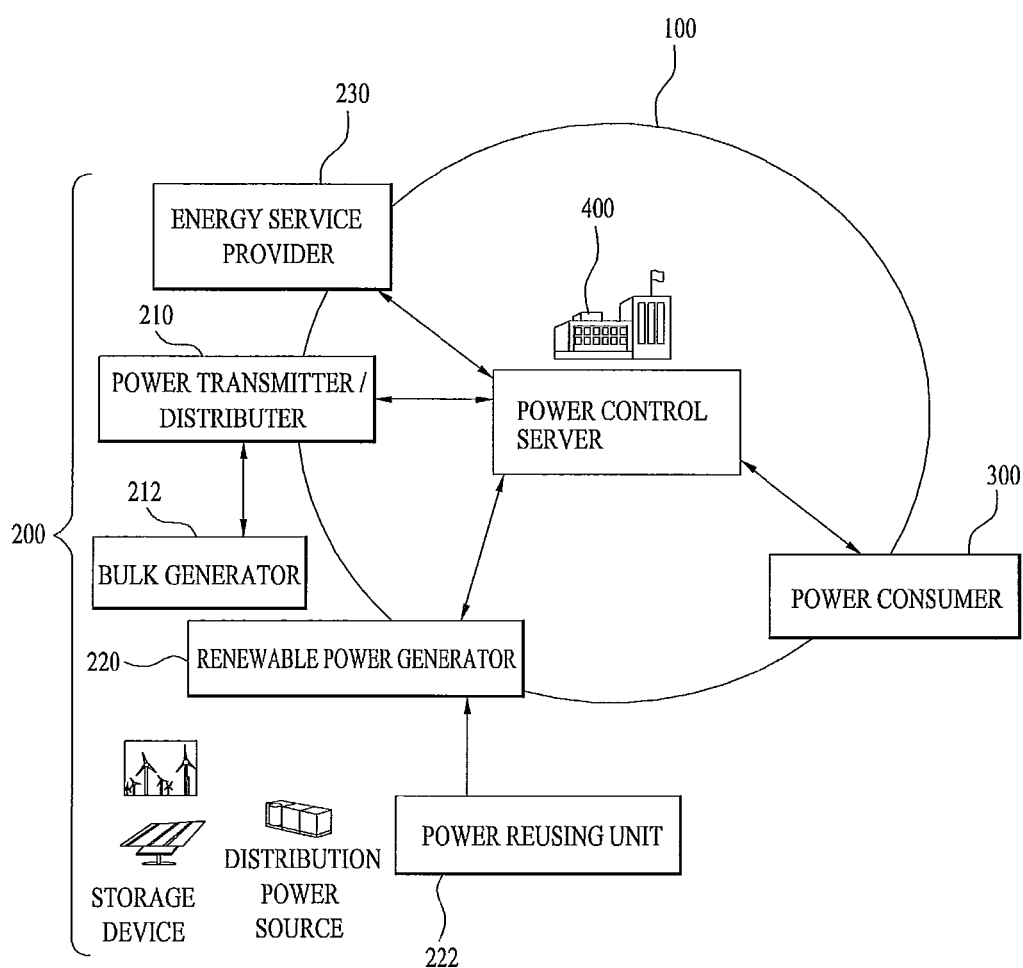
FIG. 1 is a schematic diagram showing a power control system according to an embodiment of the present invention.

FIG. 1 is a schematic diagram showing a power control system according to an embodiment of the present invention. As shown in FIG. 1, a power supply 200 for supplying power to a power consumer 300 and the power consumer 300 for receiving the power from the power supply 200 and using the power are connected to a power information network 100 of the power control system. In addition, a power control server 400 for adjusting or controlling the activity of the power supply 200 and the power consumer 300 is further connected to the power information network 100 so as to exchange information in real time.

The power supply 200, the power consumer 300 and the power control server 400 may be independent or combined. In addition, in the power information network 100, a plurality of power supplies 200, a plurality of power consumers 300 and a plurality of power control servers 400 may be present.

The power supply 200 connected to the power information network 100 includes a power transmitter/distributor 210, a renewable power generator 220, and an energy service provider 230.

The energy service provider 230 provides power information to the power consumer 200 and the power control server 400 through the power information network 100. The power information provided by the energy service provider 230 includes power failure information, power demand information, etc. as will be described later.

The power transmitter/distributor 210 and the renewable power generator 220 function as an energy source for providing power through the power information network 100. For example, the power transmitter/distributor 210 includes a bulk generator 212 for supplying primary power. In addition, the renewable power generator 220 includes a power reusing unit 222 including a storage device and a distribution power source for generating secondary power.

The power consumer 300 connected to the power information network 100 may include all facilities requiring power, such as residential buildings, offices and factories, to which a smart grid is applied. The power consumer 300 includes a power storage unit for storing reserve power as a precaution against power failure and a power control device for controlling the power storage unit. Hereinafter, the power control device according to an embodiment of the present invention included in the power consumer 300 will be described.

Figure 2:
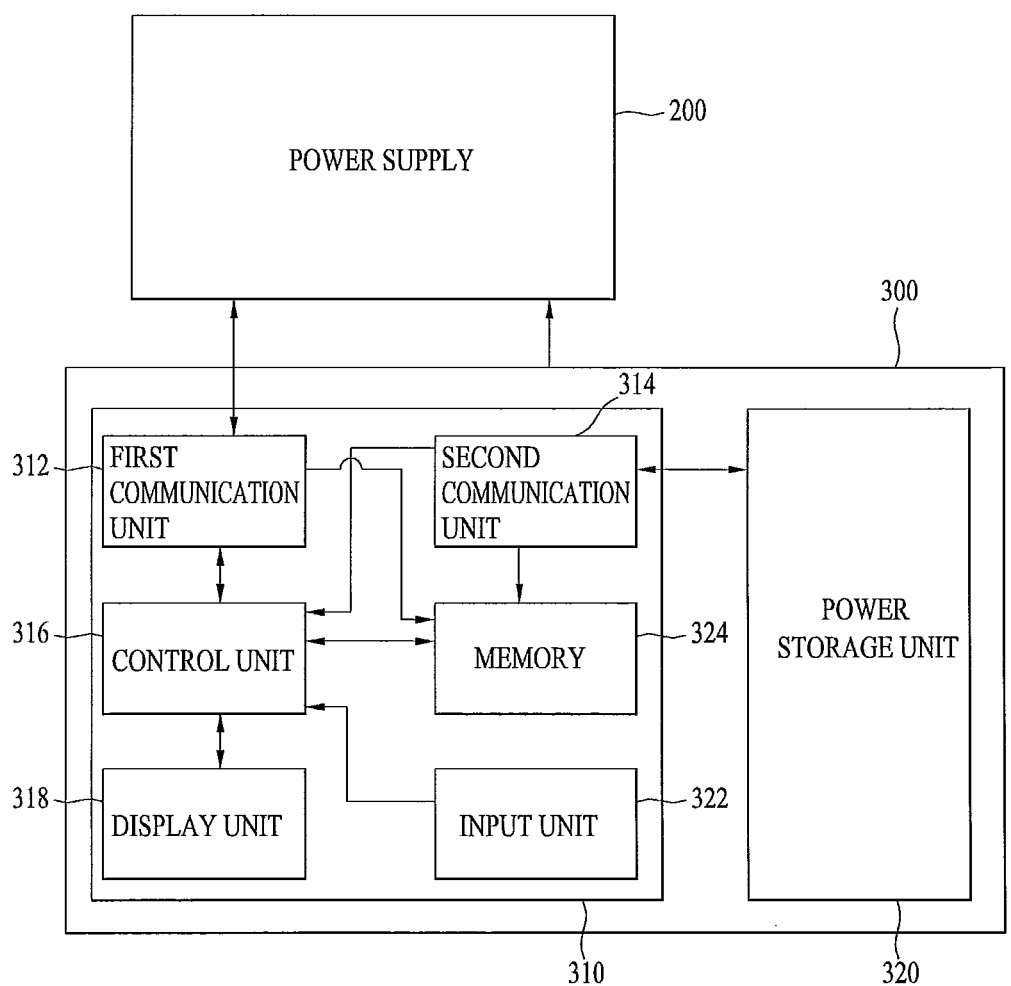
FIG. 2 is a block diagram showing a power control device according to an embodiment of the present invention.

FIG. 2 is a block diagram showing a power control device 310 and a power storage unit 320 according to an embodiment of the present invention. As shown in FIG. 2, the power control device 310 according to the embodiment of the present invention includes a first communication unit 312, a second communication unit 314, a control unit 316, a display unit 318, an input unit 322 and a memory 324. The power control device 310 shown in FIG. 2 is an exemplary embodiment of the present invention and the present invention is not limited thereto. The components may be integrated or may be divided and implemented by software or hardware.

The first communication unit 312 receives power information from at least one of the power supplies 200 or the power control server 400 through the power information network 100 and transmits the received power information to the control unit 316. The power information received through the power information network 100 includes power failure information, power demand information and hourly power rate information.

The second communication unit 314 receives reserve power information from the power storage unit 320 for storing reserve power as a precaution against power failure and transmits the reserve power information to the control unit 316. The information received by the first communication unit 312 and the second communication unit 314 will be described in detail later.

The control unit 316 generates charging control information for storing the reserve power in the power storage unit 320 based on the power information received by the first communication unit 312 and the reserve power information received by the second communication unit 314, and controls storage of the power in the power storage unit 320. At this time, even at peak load, the use of the power stored in the power storage unit 320 is preferably restricted as a precaution against power failure. In addition, the control unit 316 controls the power storage unit 320 to supply power to the power consumer 300 upon power failure and controls the power consumer 300 to be switched to a power saving mode for reducing power consumption. In the power saving mode, specific electrical apparatuses may be operated in a low power state. In addition, if the anticipated amount of power to be required during a power failure duration is greater than the remaining amount of power stored in the power storage unit 320 according to the monitoring result during power failure, the power consumer is operated in a super power saving mode to restrict the use of specific electrical apparatuses and drive only essential electrical apparatuses.

When power failure occurs in practice and, at the same time, switching to the reserve power is performed, temporary power instability may occur. By receiving power from the power storage unit 320 before actual power failure occurs, it is possible to prevent any fluctuation in power supply. The operation of the control unit 316 will be described in detail later.

The display unit 318 displays the power failure information and the power demand information received through the power information network, the reserve power information received from the power storage unit 320 and the charging control information generated by the control unit 316, and presents the information to a user.

The input unit 322 may enable the user to input a charging control command by referring to the information displayed by the display unit 318. The control unit may control the storage of the power in the power storage unit 320 according to the input of the charging control command of the user. The display unit 318 may be a touch panel. In this case, the input unit 322 may be implemented on a screen of the display unit 318.

The control unit 316 may request user input according to setting or may also automatically control the storage of the power in the power storage unit 320 regardless of the user input.

The memory 324 stores the power failure information and the power demand information received through the first communication unit 312, the reserve power information received from the power storage unit 320 through the second communication unit 314, and the charging control information generated by the control unit 316. The control unit 316 may directly receive the information from the first communication unit 312 and the second communication unit 314 so as to perform a control function or may also perform a control function using the information temporarily stored in the memory 324.

Hereinafter, the information which is externally received by the power control device 310 and the information which is internally generated by the power control device 310 based on the externally received information according to the embodiment will be described in detail with reference to FIGS. 3 to 7. A state in which the power control device 310 displays the information using the display unit 318 is shown in each drawing. The detailed configuration of the power control device 310 and the detailed content of the information shown in the drawings are exemplary and the present invention is not limited thereto.

The power control device 310 according to the present invention may be any one of a smart server, a smart meter, a smart TV and a smart phone and may be configured by implementing the functions of the present invention in the above-described apparatuses. In FIGS. 3 to 7, it is assumed that the power control device 310 is a smart meter. Accordingly, the power control device 310 according to the embodiment of the present invention includes an electronic watt-hour meter having a function for measuring the amount of power used per hour and transmitting the information about the amount of power used per hour. The power control device 310 includes a display unit, checks power consumption in real time and performs bidirectional communication between the power supply and the power consumer.

The input unit 322 for enabling the user to set a power control operation, etc. if necessary is provided at one side of the power control device 310. If the display unit 318 is a touch panel, the input unit 322 may be implemented in the display unit 318.

The user may arbitrarily set a charging start time and a charging end time using the input unit 322 as a precaution against power failure, and the power control device 310 can control the operation of the power storage unit 300 according to the setting of the user. As described above, the power control device 310 may automatically perform charging as a precaution against power failure, regardless of the user input.

Figure 3:
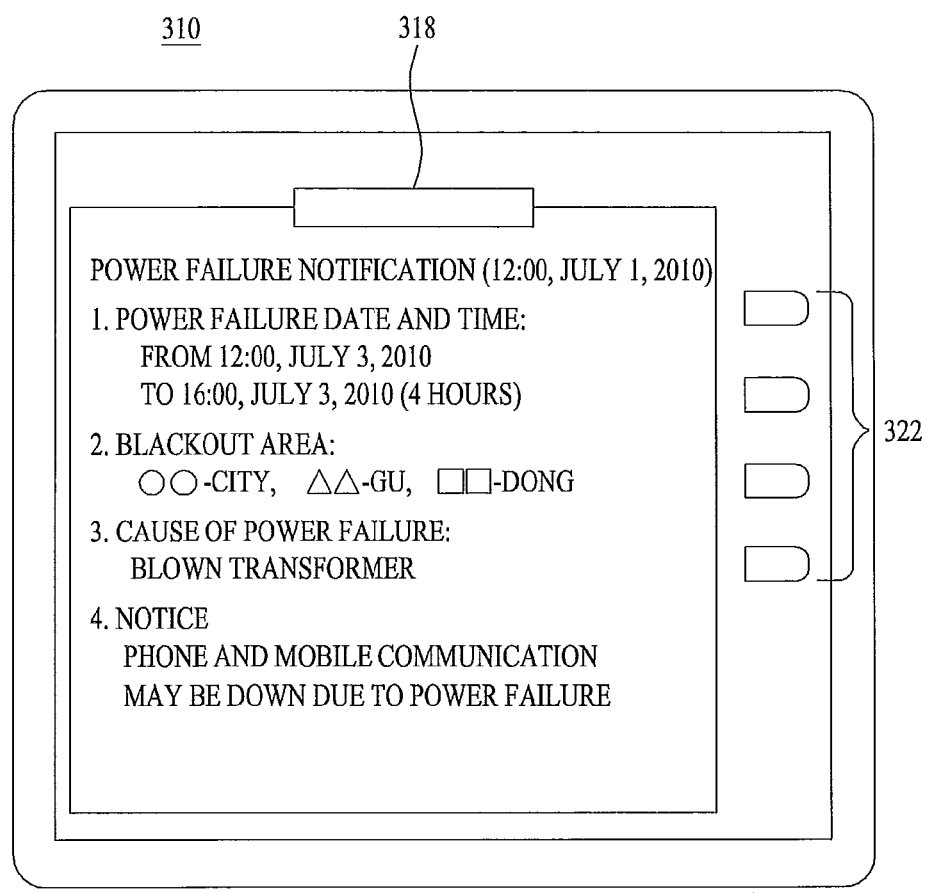
FIG. 3 is a schematic diagram showing a state in which the power control device according to the embodiment of the present invention displays power failure information.

FIG. 3 is a schematic diagram showing a state in which the power control device 310 according to the embodiment of the present invention displays power failure information notifying the user of the occurrence of power failure in advance. The power failure information is provided from the power supply 200 or the power control server 400 to the power consumer 300 and is used as information for securing the reserve power as a precaution against power failure. The first communication unit 312 of the power control device 310 receives the power failure information and transmits the power failure information to the control unit 316 and the memory 324, and the control unit 316 controls the display unit 318 to display the power failure information and to present the power failure information to the user.

As shown in FIG. 3, the power failure information includes power failure duration information, power failure start time information, power failure end time information and blackout area information. The power failure information may further include information about why power failure occurred and notices and requirements upon occurrence of power failure. The blackout area information may include unique identification of the power consumer 300 so as to indicate which power consumer 300 is within the power failure occurrence area. In this case, the power control server 400 may provide the power failure information only to the power consumer 300 corresponding to the blackout area.

Figure 4:
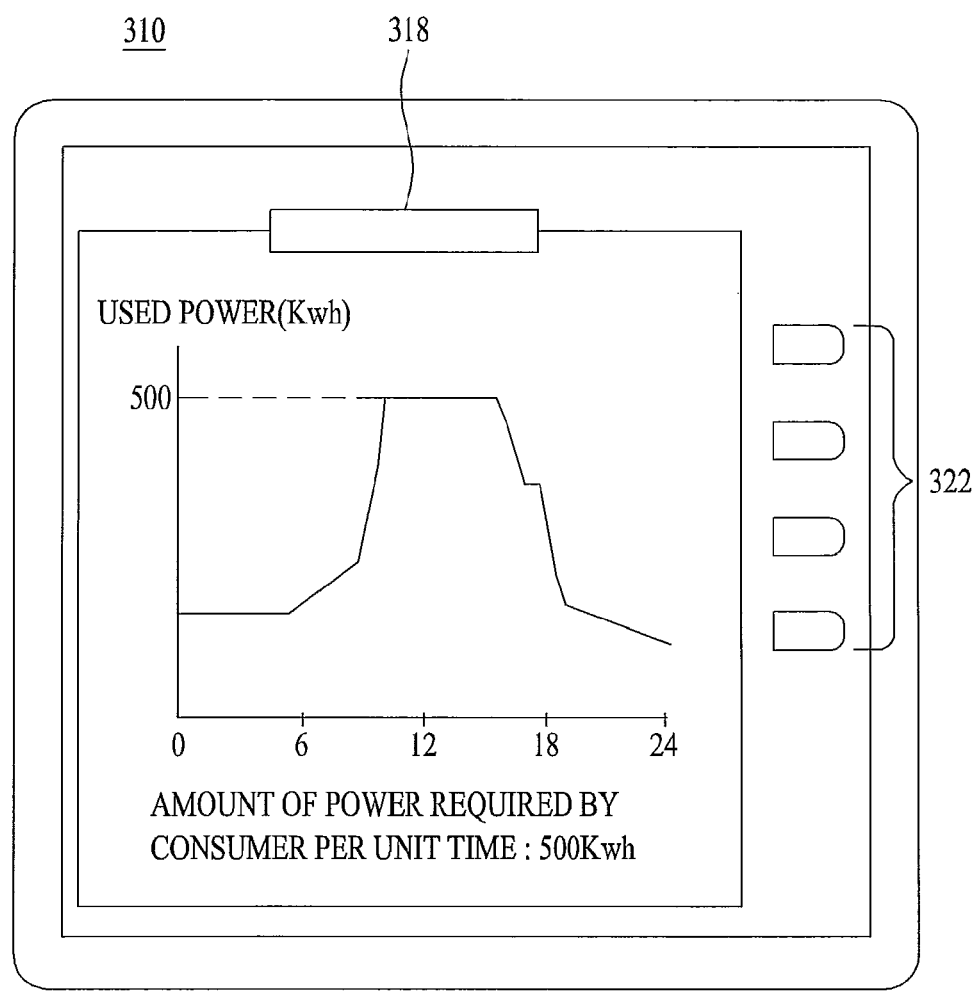
FIG. 4 is a schematic diagram showing a state in which the power control device according to the embodiment of the present invention displays power demand information.

FIG. 4 is a schematic diagram showing a state in which the power control device 300 according to the embodiment of the present invention displays power demand information indicating the power use pattern of the power consumer 300. As shown in FIG. 4, the power demand information may be displayed in the form of a graph of used power vs. time, which is obtained by an average daily power use pattern of the power consumer 300. The power demand information is displayed with time and may be provided in consideration of other factors influencing the power use patterns, such as season, day of the week, weather, etc. The power demand information may be displayed as an average value of the amount of power required by the power consumer 300 per unit time. In the embodiment of the present invention, the power demand information is used to calculate the amount of power required by the power consumer 300 in the event of a power failure. The power demand information may be received from an external device through the power information network 100. Alternatively, the power control device 310 may autonomously analyze the power use pattern of the power consumer 300, generate and store the power demand information in the memory 324, and use the stored power demand information.

Figure 5:
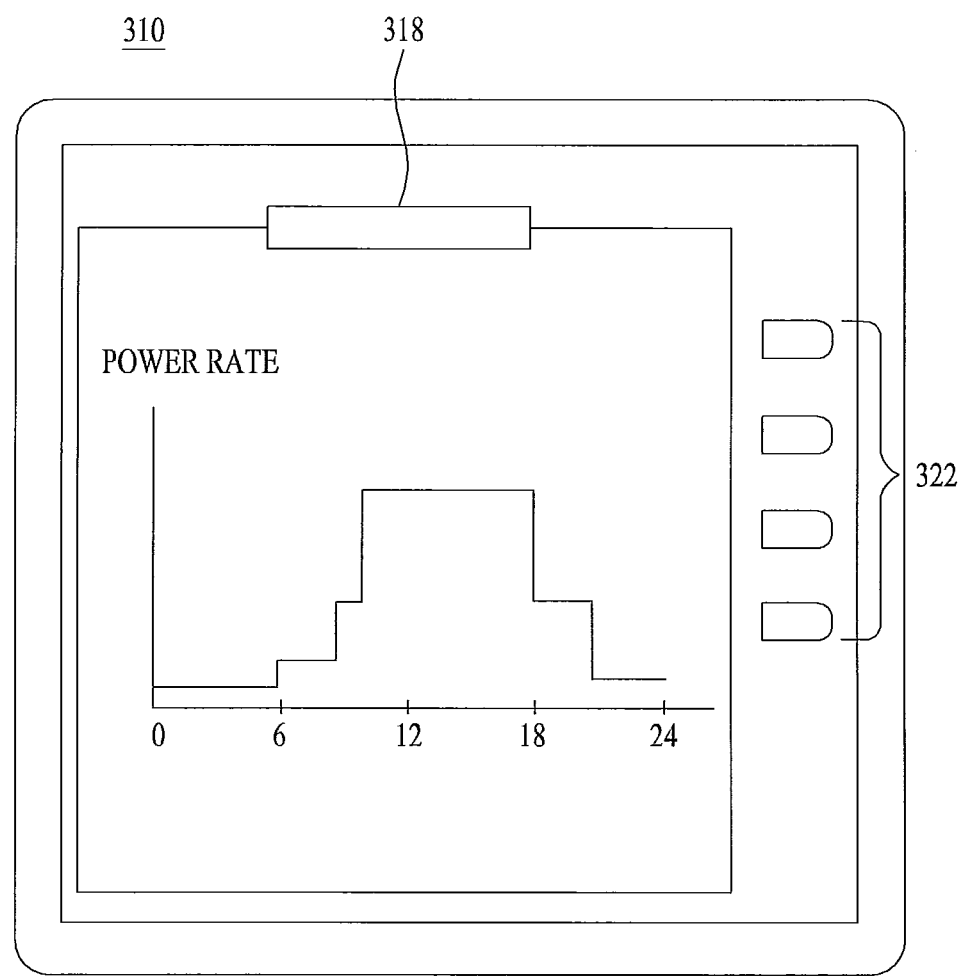
FIG. 5 is a schematic diagram showing hourly power rate information according to an embodiment of the present invention.

FIG. 5 is a schematic diagram showing a state in which the power control device 310 according to the embodiment of the present invention displays hourly power rate information. As shown in FIG. 5, the hourly power rate information may be displayed in the form of a power rate vs. time graph. The power rate information may be provided through the power information network 100 in real time or may be predefined and stored in the memory 324. As shown in FIG. 5, the power rate is increased at a time when power demand is high, such as in the daytime, and is decreased at a time when power demand is low, such as in the nighttime. The hourly power rate information is used to determine a most suitable time to store power in the power storage unit 320 as a precaution against power failure. The reserve power is preferably stored at night.

Figure 6:
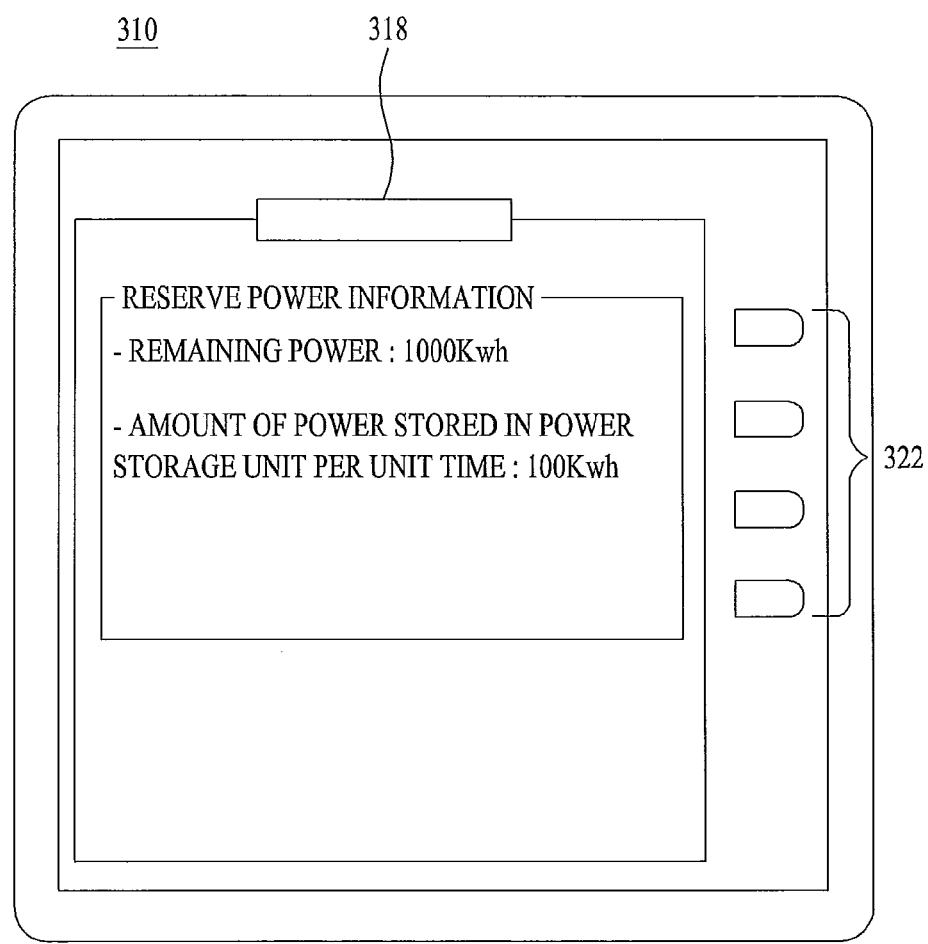
FIG. 6 is a schematic diagram showing a state in which the power control device according to the embodiment of the present invention displays reserve power information.

FIG. 6 is a schematic diagram showing a state in which the power control device 310 according to the embodiment of the present invention displays reserve power information. The reserve power information includes remaining power information indicating the amount of available reserve power currently stored in the power storage unit 320 and information about the amount of power stored in the power storage unit per unit time indicating the rate at which the power storage unit 320 is being charged. The amount of power required upon power failure and the time required for charging are calculated based on the reserve power information.

Figure 7:
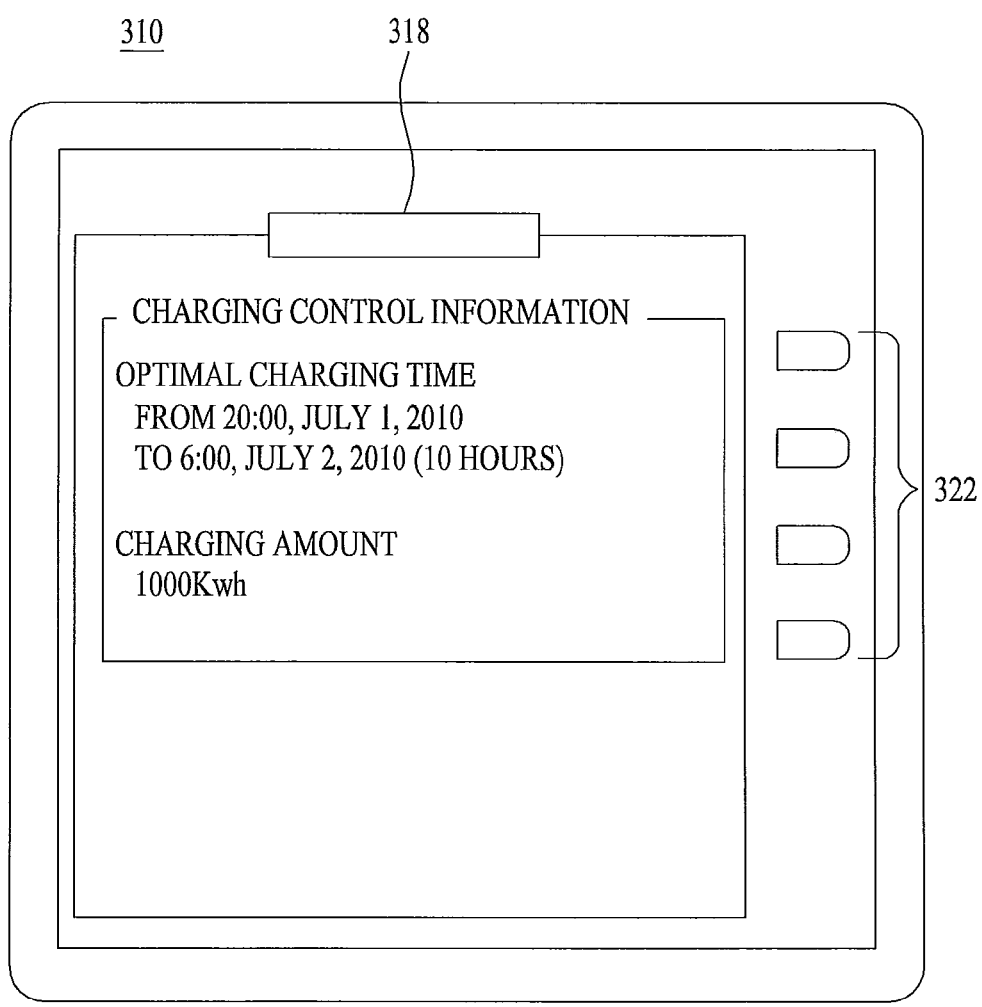
FIG. 7 is a schematic diagram showing a state in which the power control device according to the embodiment of the present invention displays charging control information.

FIG. 7 is a schematic diagram showing a state in which the power control device 310 according to the embodiment of the present invention displays charging control information. As shown in FIG. 7, the charging control information includes charging start time information indicating an operation start time of the power storage unit 320 and charging end time information indicating an operation end time of the power storage unit 320, for securing the reserve power. The charging duration information of the power storage unit 320 may be calculated from the charging start time information and the charging end time information. On the contrary, the charging end time information may also be calculated from the charging start time information and the charging duration information.

If it is difficult to sufficiently secure the charging time as precaution against power failure, the control unit 316 notifies the user that the charging time is not sufficient through the display unit 318 so as to enable the user to set the use restriction of some electrical apparatuses. The control unit may determine whether or not the charging amount is secured according to the user use restriction settings and may notify the user of the determination result.

Hereinafter, the charging control information generated by the control unit 316 and the operation of the control unit 316 therefor will be described in detail.

The control unit 316 determines whether the power consumer 300 is within a blackout area based on the blackout area information included in the power failure information and performs an operation for generating the charging control information if the power consumer 300 is within the blackout area. As described above, since the power control server can provide the power failure information only to the power consumer 300 within the blackout area, the control unit 316 generates the charging control information regardless of the determination as to whether the power consumer is within the blackout area.

In addition, the control unit 316 generates the necessary power amount information based on the power failure duration information and the amount of power required by the consumer per unit time included in the power failure information. For example, if the power failure duration is 4 hours as shown in FIG. 3 and the amount of power required by the consumer is 500 Kwh as shown in FIG. 4, they are multiplied so as to calculate the amount of power required upon power failure of 2000 Kwh.

The control unit 316 generates necessary charge information based on the necessary power amount information and the remaining power information. For example, as shown in FIG. 6, if the remaining amount of power stored in the power storage unit 320 is 1000 Kwh, the necessary charging amount becomes 1000 Kwh by subtracting the remaining power from the necessary power amount of 2000 Kwh. In order to more sufficiently secure reserve power, the necessary charging amount may be set to be greater than the calculated power amount by 10% or more.

In addition, the control unit 316 generates the charging duration information of the power storage unit 320 based on the necessary charge information and the information about the amount of power stored in the power storage unit per unit time. For example, as shown in FIG. 6, if the power storage unit 320 charges at a rate of 100 Kwh, the charging duration becomes 10 hours by dividing the necessary charging amount of 1000 Kwh by 100 Kwh. By this operation, it is possible to prevent power from being unnecessarily stored and to efficiently use power.

In addition, the control unit 316 generates the charging start time information and the charging end time information based on the power failure start time information and the charging duration information. That is, the charging start time may be set such that the storage of the power in the power storage unit 320 is completed before power failure occurs. At this time, the control unit 316 may generate optimal charging start time information based on the hourly power rate information. That is, the charging duration for securing the necessary charge may be set to a duration when the power rate is lowest. For example, as shown in FIG. 3, if the power failure information is received at 12:00, Jul. 1, 2010 and a power failure start time is 12:00, Jul. 3, 2010, in the example of FIG. 5, a charging start time is set to 20:00, Jul. 1, 2010 and a charging end time is set to 06:00, Jul. 2, 2010 so as to secure a charging duration of 10 hours. That is, it is possible to secure a charging duration with a minimum power rate.

By this operation, the power consumer 300 can use power when rates are at their lowest so as to efficiently secure the reserve power. In addition, the power supply 200 reduces the use of power at a time when power consumption is highest and prompts the use of power at a time when power consumption is lowest. Accordingly, since it is possible to suppress increase in maximum power demand, it is possible to reduce costs for adding facilities for satisfying peak demand.

In order to secure sufficient power to be used upon power failure, the control unit 316 may control the power storage unit 320 to completely store the power regardless of the charging control information according to the setting of the user.

Figure 8:
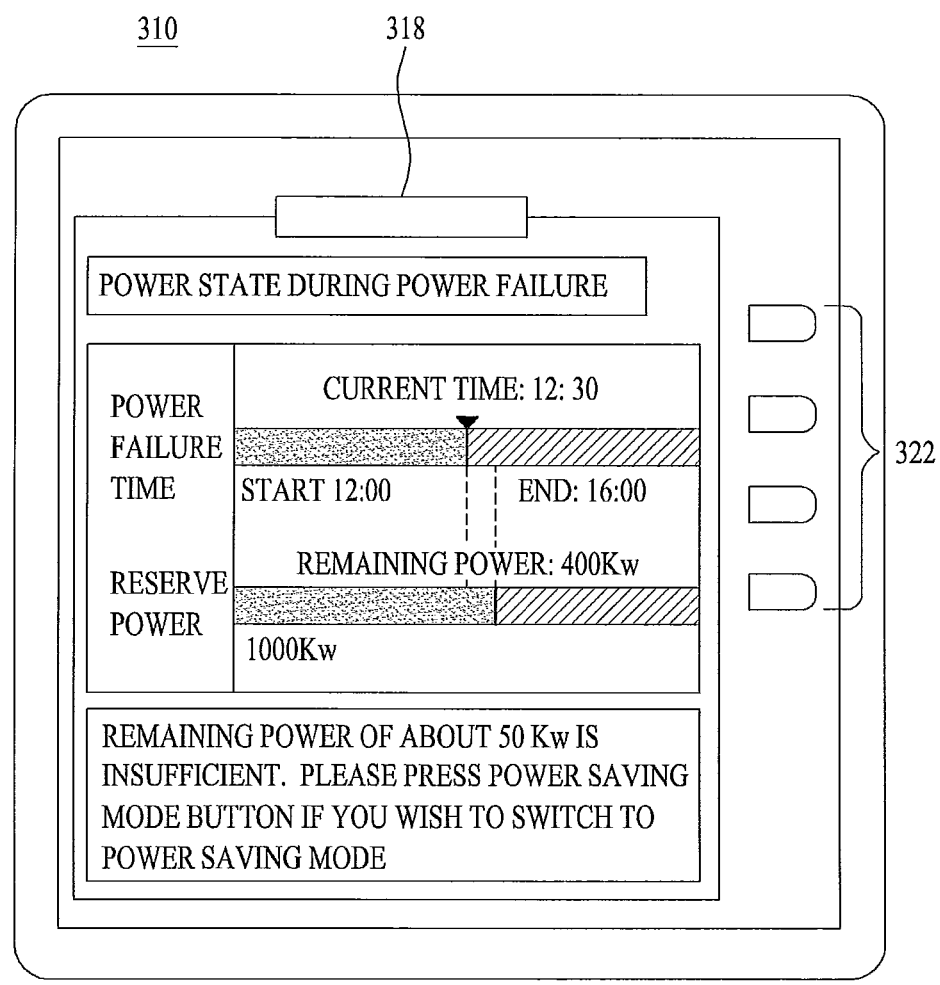
FIG. 8 is a schematic diagram showing a state in which the power control device according to the embodiment of the present invention displays power state information during power failure.

FIG. 8 is a schematic diagram showing a state in which the power control device 310 according to the embodiment of the present invention displays power state information during power failure. If power failure occurs in practice, the power control device 310 presents the power failure state and the state of the reserve power stored in the power storage unit 320 to the user in real time. For example, as shown in FIG. 8, a current time and a remaining power during power failure are displayed in the form of a graph so as to be compared with each other. In addition, the power control device 310 checks expected power consumption in real time, notifies the user that the remaining power is insufficient for the expected power failure duration, if it is determined that the remaining power is insufficient, and switches the consumer to a power saving mode or an ultra power saving mode according to user selection. In this case, the user may input a command for switching the consumer to the power saving mode or the ultra power saving mode using a button of the input unit 322. In contrast, according to user setting, the control unit may automatically switch the consumer to the power saving mode or the ultra power saving mode without user input, if the remaining power is insufficient.

Figure 9:
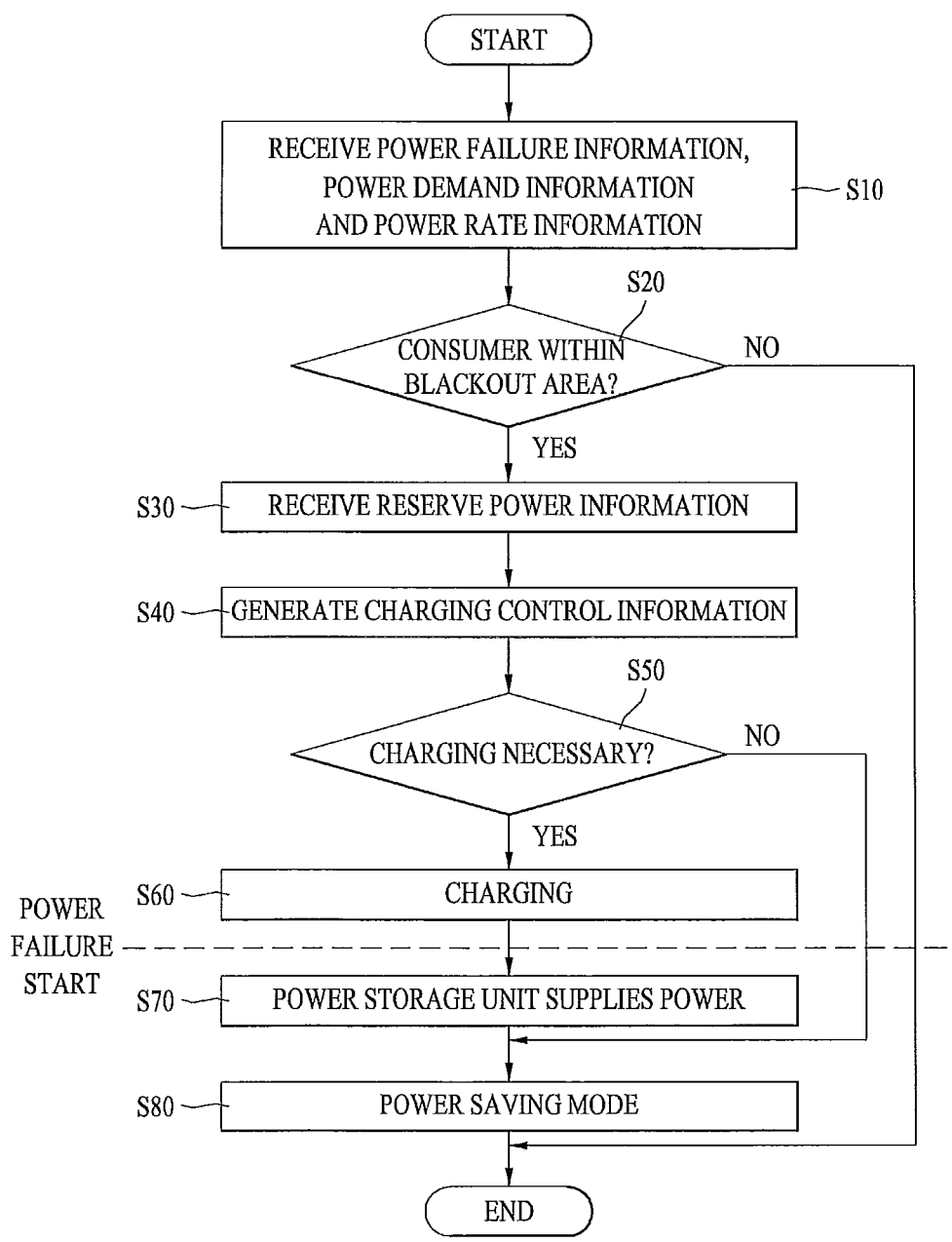
FIG. 9 is a flowchart illustrating a power control method according to an embodiment of the present invention.

FIG. 9 is a flowchart illustrating a power control method according to an embodiment of the present invention. Hereinafter, the power control method according to the embodiment of the present invention will be described with reference to FIG. 9.

First, the power information including the power failure information, the power demand information and the power rate information is received from the power supply or the power control server through the power information network (S10). As shown in FIG. 3, the power failure information includes the power failure duration information, the power failure start time information and the blackout area information. In addition, the power failure information may further include the cause of power failure and notices and requirements in the event of a power failure. The power failure information is used as information for securing the reserve power as a precaution against power failure.

As shown in FIG. 4, the power demand information may be displayed in the form of a graph of used power vs. time. The power demand information is used to calculate the amount of power required by the power consumer 300 in the event of a power failure.

As shown in FIG. 5, the power rate information may be displayed in the form of a power rate vs. time graph and may by provided in real time or may be predefined. The hourly power rate information is used to determine a most suitable time to charge the power storage unit 320 as a precaution against power failure.

Next, a determination as to whether the power consumer 300 is within a blackout area is made based on the blackout area information included in the power failure information (S20). If it is determined that the power consumer 300 is not in the blackout area, since the reserve power prepared for power failure does not need to be secured, the process is finished without an additional operation. In addition, since the blackout area information includes the unique indication of the power consumer 300, this step may be omitted if information indicating that the power consumer 300 is within the blackout area is directly received.

If it is determined that the power consumer 300 is within the blackout area, the reserve power information including the remaining power information is received from the power storage unit 320 for storing the reserve power (S30). As shown in FIG. 6, the reserve power information includes the remaining power information and the information about the amount of power stored in the power storage unit 320 per unit time.

Next, the charging control information for storing the reserve power in the power storage unit 320 is generated based on the power information and the reserve power information (S40). As shown in FIG. 7, the charging control information includes the charging start time information and the charging end time information (charging duration information). A method of generating the charging control information will be described later.

Next, a determination as to whether power needs to be stored in the power storage unit 320 as a precaution against power failure is made based on the generated charging control information (S50). If the reserve power stored in the power storage unit 320 is sufficient, charging is not performed. In this case, since power consumption needs to be minimized upon power failure, the consumer is switched to the power saving mode upon power failure.

If the reserve power stored in the power storage unit 320 is insufficient, the power is stored in the power storage unit 320 according to the charging control information (S60). That is, charging is started and finished based on the charging start time and the charging end time included in the generated charging control information.

If a power failure occurs in practice, the reserve power stored in the power storage unit 320 is supplied to the power consumer 300 (S70). If power failure occurs in practice and, at the same time, switching to the reserve power is performed, temporary power instability may occur. By performing switching before actual power failure, it is possible to prevent any fluctuation in the power supply. In this case, in order to minimize power consumption, the power consumer is operated in the power saving mode.

Figure 10:
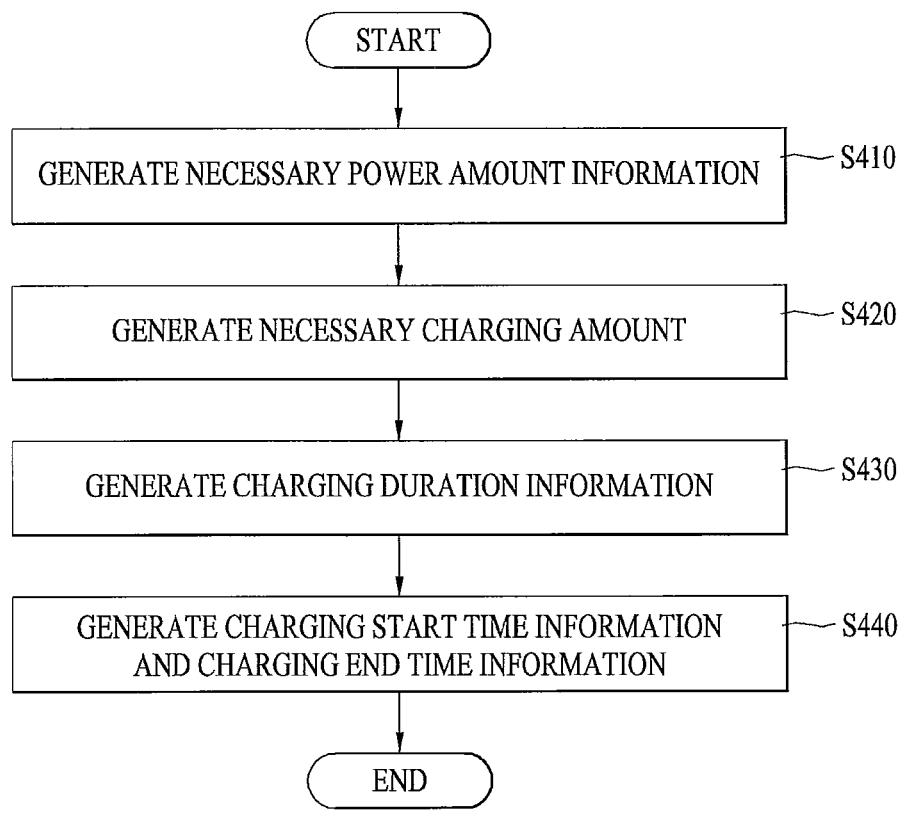
FIG. 10 is a flowchart illustrating a step of generating charging control information of FIG. 9.

Hereinafter, the method of generating the charging control information will be described in detail. FIG. 10 is a flowchart illustrating the step of generating the charging control information of FIG. 9.

First, the necessary power amount information is generated based on the power failure duration information and the information about the amount of power required by the consumer per unit time included in the power failure information (S410). For example, if the power failure duration is 4 hours and the amount of power required by the consumer per time is 500 Kwh, they are multiplied so as to calculate the amount of power required upon power failure of 2000 Kwh.

Next, the necessary charge information is generated based on the necessary power amount information and the remaining power information (S420). For example, if the remaining amount of power stored in the power storage unit 320 is 1000 Kwh, the necessary charging amount becomes 1000 Kwh by subtracting the remaining power from the necessary power amount of 2000 Kwh. In order to more sufficiently secure the reserve power, the necessary charging amount may be set to be greater than the calculated power amount by 10% or more.

Next, the charging duration information of the power storage unit 320 is generated based on the necessary charge information and the amount of power stored in the power storage unit per unit time (S430). For example, if the amount of power stored in the power storage unit 320 per unit time is 100 Kwh, the charging duration becomes 10 hours by dividing the necessary charging amount of 1000 Kwh by 100 Kwh. By this operation, it is possible to prevent power from being unnecessarily stored and to efficiently use power.

Next, the charging start time information and the charging end time information (charging duration information) are generated based on the power failure start time information and the charging duration information (S440). That is, the charging start time may be set such that the storage of the power in the power storage unit 320 is completed before power failure begins in practice. At this time, the control unit 316 may generate optimal charging start time information based on the hourly power rate information. That is, the charging duration for securing the necessary charging amount may be set to a duration when the power rate is lowest.

For example, if the power failure information is received at 12:00, Jul. 1, 2010 and a power failure start time is 12:00, Jul. 3, 2010, in the example of FIG. 5, a charging start time is set to 20:00, Jul. 1, 2010 and a charging end time is set to 06:00, Jul. 2, 2010 so as to secure a charging duration of 10 hours. That is, it is possible to secure a charging duration with a minimum power rate.

By this operation, the power consumer can use power at a time when a power rate is lowest so as to efficiently secure the reserve power. In addition, the power supply reduces the use of power at a time when power rate is highest and prompts the use of power at a time when power rate is lowest. Accordingly, since it is possible to suppress increase in maximum power demand, it is possible to reduce costs for adding facilities for satisfying maximum power demand.

According to a power control device and a power control method of the present invention, it is possible to secure reserve power as a precaution against power failure and to stably use electrical apparatuses.

According to a power control device and a power control method of the present invention, it is possible to sufficiently secure reserve power with lowest costs.

It will be apparent to those skilled in the art that various modifications and variations can be made in the present invention without departing from the spirit or scope of the invention. Thus, the present invention is intended to cover the modifications and variations of this invention provided they come within the scope of the appended claims and their equivalents.

What is claimed is:

1. A power control device comprising:
a memory;
a power storage unit for storing power; and
a power control device configured to:
receive power information including power failure information and power demand information of a power consumer, the power failure information including power failure start time information and power failure duration information, the power demand information including the amount of power required by the power consumer per unit time;
receive reserve power information including remaining power information from a power storage unit for storing reserve power, the reserve power information including information about the amount of power stored in the power storage unit per unit time;
generate power amount information based on the power failure duration information and the information about the amount of power required by the power consumer per unit time;
generate charge information based on the power amount information and the remaining power information;
generate the charging duration information of the power storage unit based on the charge information and the information about the amount of power stored in the power storage unit per unit time;
generate charging start time information based on the power failure start time information and the charging duration information; and
control storage of the power in the power storage unit based on charging control information including the power amount information, the charge information, the charging duration information, and charging start time information,
wherein, when power failure occurs, a first message for notifying a power failure state, a second message for notifying a state of the reserve power stored in the power storage unit, and a third message for notifying insufficiency of the remaining power are displayed on a display unit, and
wherein, when it is determined that the remaining power is insufficient for the expected power failure duration, the third message is displayed on the display unit.

2. A method of controlling a power control device, the method comprising:
receiving power information including power failure information and power demand information of a power consumer, the power failure information including power failure start time information and power failure duration information, the power demand information including an amount of power required by the power consumer per unit time;
receiving reserve power information including remaining power information from a power storage unit for storing reserve power, the reserve power information including information about and amount of power stored in the power storage unit per unit time;
generating power amount information based on the power failure duration information and the information about the amount of power required by the power consumer per unit time;

generating charge information based on the power amount information and the remaining power information;

generating the charging duration information of the power storage unit based on the charge information and the information about the amount of power stored in the power storage unit per unit time;

generating charging start time information based on the power failure start time information and the charging duration information; and controlling storage of the power in the power storage unit based on charging control information including the power amount information, the charge information, the charging duration information, and charging start time information, wherein, when power failure occurs, a first message for notifying a power failure state, a second message for notifying a state of the reserve power stored in the power storage unit, and a third message for notifying insufficiency of the remaining power are displayed on a display unit, and wherein, when it is determined that the remaining power is insufficient for the expected power failure duration, the third message is displayed on the display unit.

3. The method according to claim 2, wherein:

the power failure information further includes blackout area information, and the method further includes determining whether the power control device is within a blackout area based on the blackout area information.

4. The method according to claim 2, further comprising displaying and presenting the power failure information, the power demand information, the remaining power information and the charging duration information.

5. The method according to claim 4, further comprising:

receiving a charging control command; and controlling the storage of the power in the power storage unit according to the charging control command.

6. The method according to claim 2, further comprising supplying power from the power storage unit upon the power failure and switching to a power saving mode for reducing power consumption based on the remaining power information.

7. A power control device comprising:

a memory;

a first communication unit configured to receive power information including power failure information and power demand information of a power consumer through a power information network, the power failure information including power failure start time information and power failure duration information, the power demand information including an amount of power required by the power consumer per unit time;

a second communication unit configured to receive reserve power information including remaining power information from a power storage unit for storing reserve power, the reserve power information including information about the amount of power stored in the power storage unit per unit time; and a control unit configured to:

generate power amount information based on the power failure duration information and the information about the amount of power required by the power consumer per unit time;

generate charge information based on the power amount information and the remaining power information;

generate the charging duration information of the power storage unit based on the charge information and the information about the amount of power stored in the power storage unit per unit time;

generate charging start time information based on the power failure start time information and the charging duration information; and control storage of the power in the power storage unit based on charging control information including the power amount information, the charge information, the charging duration information, and charging start time information, wherein, when power failure occurs, a first message for notifying a power failure state, a second message for notifying a state of the reserve power stored in the power storage unit, and a third message for notifying insufficiency of the remaining power are displayed on a display unit, and wherein, when it is determined that the remaining power is insufficient for the expected power failure duration, the third message is displayed on the display unit.

8. The power control device according to claim 7, wherein:

the power failure information further includes blackout area information, and the control unit determines whether the power control device is within a blackout area based on the blackout area information.

9. The power control device according to claim 7, further comprising a display unit configured to display and present the power failure information, the power demand information, and the remaining power information and the charging duration information.

10. The power control device according to claim 9, further comprising an input unit configured to input a charging control command, wherein the control unit controls the storage of the power in the power storage unit according to the charging control command.

11. The power control device according to claim 7, wherein the control unit controls the power storage unit to supply power upon the power failure and switches to a power saving mode for reducing power consumption based on the remaining power information.

12. The power control device according to claim 7, wherein the power control device is any one of a smart server, a smart meter, a smart TV, and a smart phone.

* * * * *